United States Patent [19]

Olofsson et al.

[11] 4,293,571

[45] Oct. 6, 1981

[54] PROCESS FOR THE PREPARATION OF A PURIFIED PROTEIN HYDROLYSATE

[75] Inventors: Mats Olofsson, Åstorp, Sweden; Marcel Buhler, Tolochenaz; Robert Wood, Le Mont-s/Lausanne, both of Switzerland

[73] Assignee: Societe d'Assistance Technique pour Produits Nestle S.A., Lausanne, Switzerland

[21] Appl. No.: 125,480

[22] Filed: Feb. 28, 1980

[30] Foreign Application Priority Data

Mar. 9, 1979 [CH] Switzerland .......................... 2278/79

[51] Int. Cl.$^3$ ............................................... A23J 3/00
[52] U.S. Cl. .......................................... 426/7; 426/34; 426/42; 426/44; 426/52; 426/56; 426/656; 426/657; 426/490; 426/495
[58] Field of Search ................. 426/7, 41, 49, 52, 656, 426/657, 34, 42, 44, 56, 490, 495

[56] References Cited

U.S. PATENT DOCUMENTS

| 3,697,285 | 10/1972 | Faith, Jr. et al. | 426/657 X |
| 3,978,234 | 8/1976 | Bosund et al. | 426/657 X |
| 4,018,752 | 4/1977 | Buhler et al. | 426/656 X |

FOREIGN PATENT DOCUMENTS

| 7215050 | 5/1973 | Netherlands | 426/657 |
| 1383223 | 2/1975 | United Kingdom | 426/656 |

*Primary Examiner*—Robert A. Yoncoskie
*Attorney, Agent, or Firm*—Vogt and O'Donnell

[57] ABSTRACT

The present invention relates to a process in which an aqueous solution of proteins is subjected to hydrolysis, the product of hydrolysis is subjected to a heat treatment to denature the proteins which it contains and, finally, the proteins are eliminated by ultrafiltration. The ultrafiltration permeate constitutes the purified protein hydrolysate.

10 Claims, No Drawings

PROCESS FOR THE PREPARATION OF A PURIFIED PROTEIN HYDROLYSATE

This invention relates to a process for the preparation of a purified protein hydrolysate, i.e. a protein hydrolysate free from proteins and macropeptides.

One of the problems encountered in the preparation of protein hydrolysates on an industrial scale is—at least for certain applications—the elimination of the proteins and macropeptides remaining therein either because some of the proteins have not been hydrolysed or sufficiently hydrolysed or because the fragments obtained have been able to recombine into agglomerates. In the dietetic field, particularly in infant formulae, it is often crucially important to know that the hydrolysates in question no longer contain proteins and macropeptides because high molecular weight substances of this type are capable of being allergens. The traditional processes, of which the key stage associates the techniques of flocculation and centrifuging, do not enable this objective to be achieved. Considerable quantities of residual or recombined proteins and macropeptides remain.

By contrast, the present invention makes it possible to obtain purified protein hydrolysates, i.e. protein hydrolysates free from residual or recombined proteins and macropeptides which, in the interests of simplicity, will be generically referred to as "proteins". The invention relates to a process in which an aqueous solution of proteins is subjected to hydrolysis, the product of hydrolysis is subjected to a heat treatment to denature the proteins which it contains and, finally, the said proteins are eliminated by ultrafiltration. The ultrafiltration permeate constitutes the purified protein hydrolysate.

In the context of the invention, the expression "aqueous solution" is understood to include both true solutions and also colloidal solutions. In addition, the expression "to denature" does not mean that denaturing has to be complete. Instead, qualitatively or quantitatively partial denaturing may be sufficient.

The starting proteins may be genuine animal proteins, such as meat proteins, fish proteins, etc. or proteins of lactic origin, casein, lactalbumin, etc. They may also be vegetable proteins from seeds or leaves, for example soya proteins or proteins from lucern leaves, or even proteins of microbial origin, such as yeast proteins.

In the first stage of the process according to the invention, these proteins are subjected either to chemical, generally acid, hydrolysis or to enzymatic hydrolysis using mixtures of enzymes or even purified enzymes. In cases where microbial proteins are used, the enzymes in question may be their own enzymes, in which case the products obtained are called autolysates. Lactalbumin is mentioned as one example of a protein advantageously treated in accordance with the invention. Hydrolysis may be carried out for example by the enzymatic process using pancreatin.

As mentioned above, the hydrolysis products obtained contain proteins, particularly where hydrolysis has been carried out under industrially acceptable conditions. They are then subjected to a heat treatment to denature the proteins which may be carried out in various ways, for example at a high temperature of from 100° to 140° C. for between 10 seconds and 4 minutes or at a lower temperature of from 75° to 100° C. for between 2 and 60 minutes.

It is advisable to mention that the heat treatment may result in inactivation of the enzyme in the case of enzymatic hydrolysis, although this secondary effect is not specifically aimed at because the enzyme will be eliminated together with the proteins during the ultrafiltration step.

The ultrafiltration step may be carried out immediately after the heat treatment, the proteins being denatured, but not necessarily flocculated. This constitutes a fundamental difference in relation to the traditional processes based on centrifuging where a residence time allowing maximum flocculation of the proteins is absolutely essential.

Alternatively, the product of hydrolysis may be passed through a colloid mill between the heat treatment and the ultrafiltration step.

As already known, the ultrafiltration step may be carried out in a closed circuit using a buffer tank into which the retentate is recycled. It may also be carried out by means of several ultrafiltration membranes or modules arranged in series.

In one advantageous variant, the retentate is diluted during ultrafiltration. This technique of ultrafiltration with simultaneous dilution is known as "diafiltration". The diluent, essentially water, is introduced into the buffer tank or between two successive ultrafiltration modules.

The temperature at which the ultrafiltration step is carried out may be freely selected although, for reasons of bacteriological safety, ultrafiltration is preferably carried out at a temperature in the range from 55° to 80° C.

The permeate or ultrafiltrate is recovered. Free from proteins, it constitutes the purified protein hydrolysate. If desired, this permeate may be concentrated, for example by evaporation, and dried to obtain a dry purified hydrolysate.

The ultrafiltration retentate may be recycled to a hydrolysis stage.

In one preferred embodiment of the process according to the invention, a solution of proteins previously heat treated for bacteriological reasons is subjected to chemical, for example acid, hydrolysis or to enzymatic hydrolysis, for example using pancreatin. The product of hydrolysis ideally has a dry matter content of from 3% to 15%. In the case of enzymatic hydrolysis, it is of advantage to work at the optimum pH of the enzyme and the pH of the protein solution is adjusted accordingly, for example with lime or phosphoric acid.

The product of hydrolysis is then heat treated, for example at 130° C. for 1 minute, either by the injection of steam or in a heat exchanger. The product of hydrolysis thus heat-treated may then be directly introduced into the ultrafiltration module or the proteins may be left to flocculate or the product of hydrolysis may be intermediately passed through a colloid mill.

Typically, the ultrafiltration module is equipped with membranes having a cut-off zone of from 1000 to 10,000.

By virtue of their composition, the purified hydrolysates prepared by the process according to the invention may be incorporated into numerous food preparations intended for dietetic use, particularly among infants or convalescents, or in readily resorbable foods intended for people suffering from allergies.

The process according to the invention is illustrated by the following Examples in which the parts and percentages quoted are by weight unless otherwise indicated.

EXAMPLES 1 to 6 (cf. Table)

A solution of proteins in water is prepared from a whey powder (lactalbumin isolated by ultrafiltration containing 85% of proteins: Examples 1 to 5; precipitated lactalbumin containing 70% of proteins: Example 6). The dissolution temperature is between 30° and 50° C.

Steam at 115° C. is then injected for 10 to 30 seconds to sterilise the solution. After cooling to 55° C., the pH is adjusted to 7.2 with $Ca(OH)_2$ and pancreatin is added in a quantity of 8%. Hydrolysis is then left to take place for 5 hours at 50° to 55° C.

The pH is then re-adjusted to 6.7 with $H_3PO_4$, followed by heat treatment as indicated in the following Table.

Ultrafiltration is carried out in an Abcor module equipped with HFM 180 SG membranes except for Example 6 where a UCARSEP 2L module (Union Carbide) equipped with NRT membranes was used.

The results obtained are set out in the Table where the degree of concentration by ultrafiltration (3x or 2x) is also indicated. Diafiltration was carried out at a constant volume.

| Example No. | Nature of the protein | % dry matter content of the product of hydrolysis | Heat treatment |
|---|---|---|---|
| 1 | lactalbumin | 9% | 98° C./30 mins. |
| 2 | lactalbumin | 9% | 130° C./ 1 min. |
| 3 | lactalbumin | 13% | 98° C./30 mins. |
| 4 | lactalbumin | 9% | 98° C./30 mins. |
| 5 | lactalbumin | 9% | 98° C./30 mins. |
| 6 | lactalbumin | 9% | 130° C./ 1 min. |

| Example No. | Ultrafiltration (UF) diafiltration (DF) | Permeation rate | |
|---|---|---|---|
| 1 | UF/65° C./3× | 80 | $1/m^2/h$ |
| 2 | UF/65° C./3× | 65 | $1/m^2/h$ |
| 3 | UF/65° C./2× | 60 | $1/m^2/h$ |
| 4 | UF 65° C./3× + DF/65° C. | 95 | $1/m^2/h$ |
| 5 | UF/65° C./3× | 125 | $1/m^2/h$ |
| 6 | UF/65° C./3× | 75 | $1/m^2/h$ |

Comparison Examples (a) The procedure is as described in Example 1 (lactalbumin −9%), except that heat treatment is carried out in such a way (90° C./5 sec.) that, in practice, no denaturing occurs. Ultrafiltration under the same conditions is possible, although the permeation rate is only 20 $1/m^2/h$.

(b) Example 3 (lactalbumin −13%) is repeated, but with the non-denaturing heat treatment indicated in (a). The permeation rate during ultrafiltration is only 15 $1/m^2/h$.

EXAMPLES 7 to 10

A protein solution is prepared as indicated below by dissolving a powder in water at 30° to 50° C.:
Example 7, lactalbumin, 8% solution
Example 8, casein, 10% solution
Example 9, soya isolate, 11% solution
Example 10, fish protein concentrate, 8% solution
Example 11, yeast protein concentrate, 12% solution In Example 7, the lactalbumin (isolated by ultrafiltration) is hydrolysed under the conditions of Examples 1 to 6, but with a mixture of 3% of pancreatin and 0.8% of neutral protease of bacterial origin (NOVO ®)

The fish (cod) protein concentrate is a 94% protein concentrate.

The yeast protein concentrate emanates from the fermentation of *Candida utilis* on molasses. It has a protein content of 55%.

The heat treatment applied and the ultrafiltration conditions are as follows:
Example 7, 130° C./1 min., UF/65° C./2x
Example 8, 130° C./1 min., UF/70° C./2x
Example 9, 130° C./1 min., UF/70° C./3x
Example 10, 98° C./30mins., UF/65° C./2x
Example 11, 98° C./30mins., UF/65° C./2x

We claim:
1. A process for the preparation of a purified protein hydrolysate comprising:
   (a) subjecting an aqueous solution of proteins to a hydrolysis treatment to yield at least hydrolysate products free of original protein and protein fragments capable of acting as allergens;
   (b) subjecting the treated aqueous solution to a heat treatment to denature the proteins not hydrolysed in step (a); and
   (c) eliminating the denatured proteins from the heat treated hydrolysate by ultrafiltration and obtaining an ultrafiltration permeate constituting the purified protein hydrolysate free of said original protein and protein fragments.
2. A process as claimed in claim 1, wherein the hydrolysis carried out is an enzymatic hydrolysis.
3. A process as claimed in claim 2, wherein the enzyme employed in the enzymatic hydrolysis is pancreatin.
4. A process as claimed in claim 1, wherein the heat treatment is carried out at 100° to 140° C. for between 10 seconds and 4 minutes.
5. A process as claimed in claim 1, wherein the heat treatment is carried out at 75° to 100° C. for between 2 and 60 minutes.
6. A process as claimed in claim 1, wherein the aqueous solution which has undergone hydrolysis is passed through a colloid mill between the heat treatment and the ultrafiltration step.
7. A process as claimed in claim 1, wherein the ultrafiltration step is carried out by diafiltration.
8. A process as claimed in claim 1, wherein the ultrafiltration step is carried out with membranes having cut-off zone of from 1,000 to 10,000.
9. The purified hydrolysate prepared by the process claimed in claim 1.
10. A food product comprising the purified protein hydrolysate prepared by the process of claim 1.

* * * * *